United States Patent
Xie et al.

(10) Patent No.: US 11,974,690 B1
(45) Date of Patent: May 7, 2024

(54) SLOW COOKER

(71) Applicant: SHENZHEN YINGBOWEIYE TECHNOLOGY CO., LTD., Shenzhen (CN)

(72) Inventors: Jingru Xie, Shenzhen (CN); Shanyou Chen, Shenzhen (CN)

(*) Notice: Subject to any disclaimer, the term of this patent is extended or adjusted under 35 U.S.C. 154(b) by 0 days.

(21) Appl. No.: 18/351,693

(22) Filed: Jul. 13, 2023

(51) Int. Cl.
*A47J 27/00* (2006.01)
*H01F 7/06* (2006.01)

(52) U.S. Cl.
CPC .......... *A47J 27/004* (2013.01); *A47J 2202/00* (2013.01); *H01F 7/06* (2013.01)

(58) Field of Classification Search
CPC .... A47J 43/0465; A47J 43/085; A47J 27/004; A47J 27/08; A47J 27/14; A47J 43/04; A47J 43/044; A47J 43/046; A47J 43/0705; A47J 43/0711; A47J 43/082; A47J 44/02; B01F 33/453; B01F 2101/14; B01F 23/232; B01F 25/3121; B01F 27/50; B01F 27/707; B01F 33/05; B01F 33/053; B01F 33/45; B01F 33/452; B01F 33/4535; B01F 35/4112; A23G 9/045; A23G 9/12; A23G 9/224
USPC ......................................... 366/273
See application file for complete search history.

(56) References Cited

U.S. PATENT DOCUMENTS

2014/0334249 A1* 11/2014 Radow ................. B01F 33/452
366/273

OTHER PUBLICATIONS

Hiramoto, WO 2012132042 A1 (Year: 2012).*
Miyauchi, JP 2000308572 A (Year: 2000).*
JP 3091789 B2 (Year: 2000).*
Li CN 204033091 U (Year: 2014).*
Kuma, WO 2011152264 (Year: 2011).*

* cited by examiner

*Primary Examiner* — Vy T Nguyen

(57) ABSTRACT

A slow cooker includes a housing, an inner container and an actuating device. The housing is provided with a first inner wall, a first accommodating cavity, and a first accommodating opening. The first accommodating cavity is formed around the first inner wall. The first accommodating cavity is communicated with the first accommodating opening. The inner container is arranged into the first accommodating cavity via the first accommodating opening. The actuating device is configured to push water in the inner container to flow. Therefore, the water in the inner container is heated by using a heating device, so that the water in the inner container flows cyclically, which can quickly make the water in the inner container to reach a uniform temperature, reduce a temperature difference of the water in the inner container in the heating process, and improve the cooking effect.

13 Claims, 9 Drawing Sheets

SLOW COOKER

TECHNICAL FIELD

The present invention relates to the field of cooking appliances, and in particular, to a slow cooker.

BACKGROUND

A slow cooker refers to a cooking method where a cooking temperature is below 100° C. It is a latest cooking technique that adheres to a brand-new cooking concept. A main principle of the slow cooker is to maintain nutritional components of a food material and the moisture of the material, and to make the taste of the material superior to ordinary cooking under a long-term low-temperature condition. At present, according to a low-temperature slow cooker on the market, a heating component is used to heat a pot body usually in two heating manners: heating a bottom of the pot body or heating a side surface of the pot body, and the pot body transfers heat to water inside. The heating manners cause non-uniform heating of the water, and heat conduction by natural flowing of the water is also relatively slow. Therefore, in the heating process, a water temperature inside the pot varies greatly, which affects the cooking effect.

SUMMARY

In order to overcome the shortcomings of the prior art, the present disclosure provides a slow cooker, including:
- a housing, wherein the housing is provided with a first inner wall, a first accommodating cavity, and a first accommodating opening; the first accommodating cavity is formed around the first inner wall; the first accommodating cavity is communicated with the first accommodating opening;
- an inner container, wherein the inner container is arranged into the first accommodating cavity via the first accommodating opening; and
- an actuating device, wherein the actuating device is configured to push water in the inner container to flow.

As the improvement of the present invention, the actuating device includes an actuating motor, a first magnetic element, and a second magnetic element; the inner container is provided with a second inner wall, a second accommodating cavity, and a second accommodating opening; the second accommodating cavity is formed around the second inner wall; the second accommodating cavity is communicated with the second accommodating opening; the actuating motor is provided with an actuating output shaft; the first magnetic element sleeves the actuating output shaft; the second magnetic element is arranged in the second accommodating cavity; when the first magnetic element rotates with the actuating output shaft, the first magnetic element actuates the second magnetic element arranged in the second accommodating cavity to rotate, so that the second magnetic element pushes the water in the inner container to flow.

As the improvement of the present invention, the inner container is provided with an accommodating slot; the accommodating slot is provided with a third accommodating opening; and the second magnetic element is arranged in the accommodating slot via the third accommodating opening.

As the improvement of the present invention, the slow cooker further including a fixed stand, wherein when the second magnetic element is arranged in the accommodating slot via the third accommodating opening; the fixed stand is covered at the third accommodating opening to stop the second magnetic element in the accommodating slot.

As the improvement of the present invention, the fixed stand is provided with several water flowing channels; and the accommodating slot, the water flowing channels, and the second accommodating cavity are communicated with each other.

As the improvement of the present disclosure, the inner container is provided with a first outer wall; when the inner container is arranged into the first accommodating cavity via the first accommodating opening, a gap is formed between the first outer wall of the inner container and the first inner wall of the housing; the actuating motor and the first magnetic element are arranged in the gap; and the actuating motor and the first magnetic element are arranged towards the second magnetic element.

As the improvement of the present invention, a supporting member is arranged on the first outer wall of the inner container; and the supporting member supports the inner container into the first accommodating cavity, so that the gap is formed between the first outer wall of the inner container and the first inner wall of the housing.

As the improvement of the present invention, the slow cooker further including a heating device and a mounting bracket, wherein the mounting bracket is connected to the housing; the heating device is connected to the mounting bracket; and the heating device is arranged around the first outer wall of the inner container.

As the improvement of the present invention, the slow cooker further including a temperature sensing probe, wherein the temperature sensing probe is arranged in the second accommodating cavity and is configured to sense a temperature of water in the second accommodating cavity.

As the improvement of the present invention, the slow cooker further including a cover body, wherein the cover body is detachably covered at the first accommodating opening; and the cover body is provided with a handle.

As the improvement of the present invention, the gap includes a first gap unit and a second gap unit. The first outer wall of the inner container includes a first outer side wall and a first outer bottom wall. The first inner wall of the housing includes a first inner side wall and a first inner bottom wall. The first gap unit is formed between the first outer side wall and the first inner side wall. The second gap unit is formed between the first outer bottom wall and the first inner bottom wall. The actuating motor and the first magnetic element is arranged in the first gap unit and/or the second gap unit.

As the improvement of the present invention, the accommodating slot is formed by sinking the second inner wall of the inner container towards the first inner wall of the housing. The second inner wall is provided with the second inner side wall and the second inner bottom wall. When the actuating motor and the first magnetic element are arranged in the first gap unit, the second inner side wall is sunken towards the first inner side wall to form the accommodating slot. Or, when the actuating motor and the first magnetic element are arranged in the second gap unit, the second inner bottom wall is sunken towards the first inner bottom wall to form the accommodating slot.

As the improvement of the present invention, the first magnetic element is a magnetic ring, and the second magnetic element is a magnetic rod.

As the improvement of the present invention, the second magnetic element includes a mounting outer shell and a magnet rod. The mounting outer shell is provided with a third accommodating cavity, and the magnet rod is arranged in the third accommodating cavity.

As the improvement of the present invention, the mounting outer shell includes an upper shell and a lower shell. The lower shell is provided with a mounting opening. When the upper shell is detachably covered at the mounting opening of the lower shell, the third accommodating cavity is formed.

As the improvement of the present invention, the mounting outer shell is a polytetrafluoroethylene mounting outer shell.

As the improvement of the present invention, the upper shell is provided with an annular convex block, and the lower shell is provided with an annular groove. When the upper shell is detachably covered at the mounting opening of the lower shell, the annular convex block is connected to the annular groove.

Beneficial effects: the present invention discloses a slow cooker, the slow cooker includes: a housing, wherein the housing is provided with a first inner wall, a first accommodating cavity, and a first accommodating opening; the first accommodating cavity is formed around the first inner wall; the first accommodating cavity is communicated with the first accommodating opening; an inner container, wherein the inner container is arranged into the first accommodating cavity via the first accommodating opening; and an actuating device, wherein the actuating device is configured to push water in the inner container to flow. Therefore, the water in the inner container is heated by using a heating device, and the actuating device pushes the water in the inner container to flow, so that the water in the inner container flows cyclically, which can quickly make the water in the inner container to reach a uniform temperature, reduce a temperature difference of the water in the inner container in the heating process, and improve the cooking effect.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
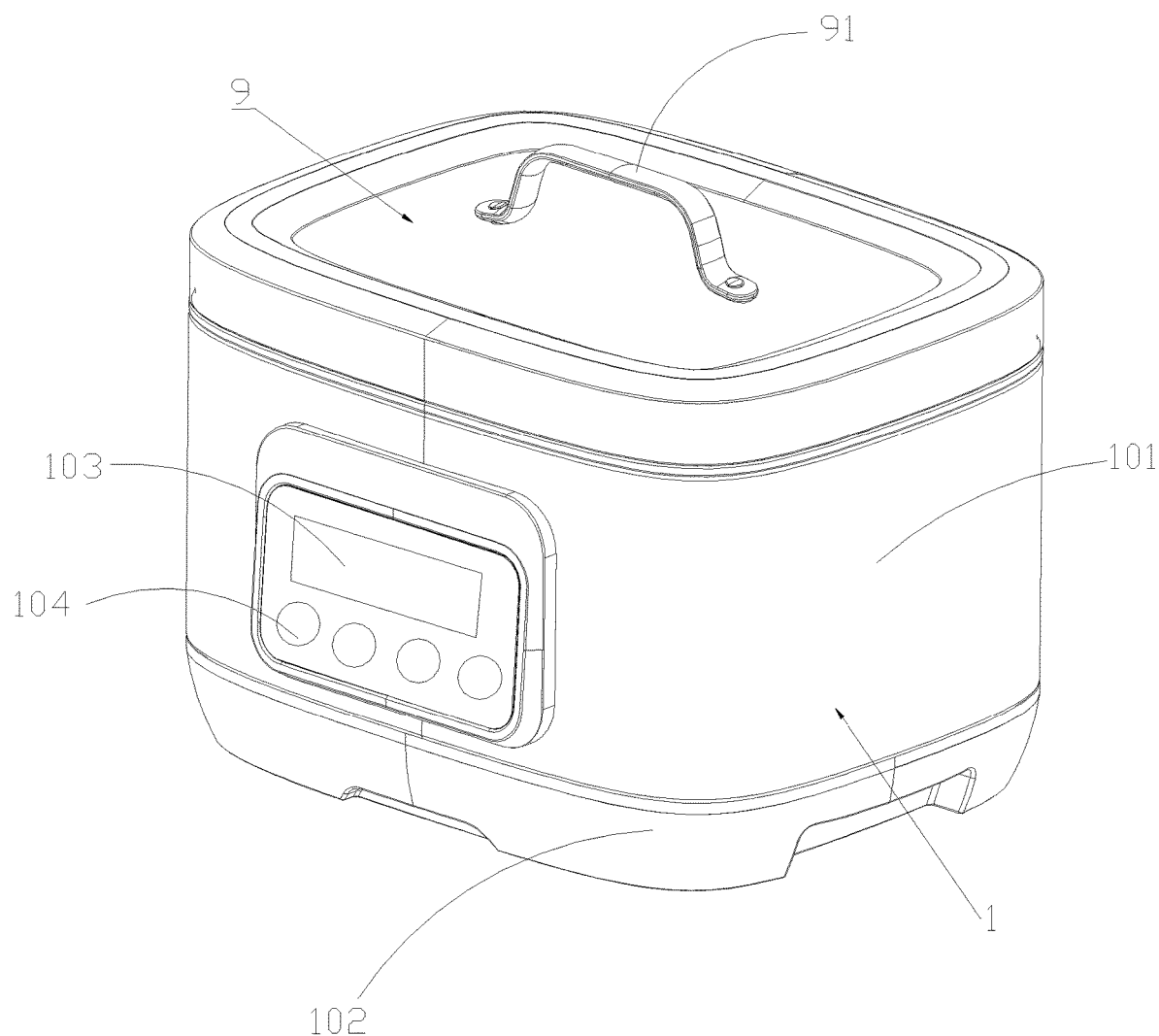
FIG. 1 is a schematic diagram of an overall structure of the present disclosure.
Figure 2:
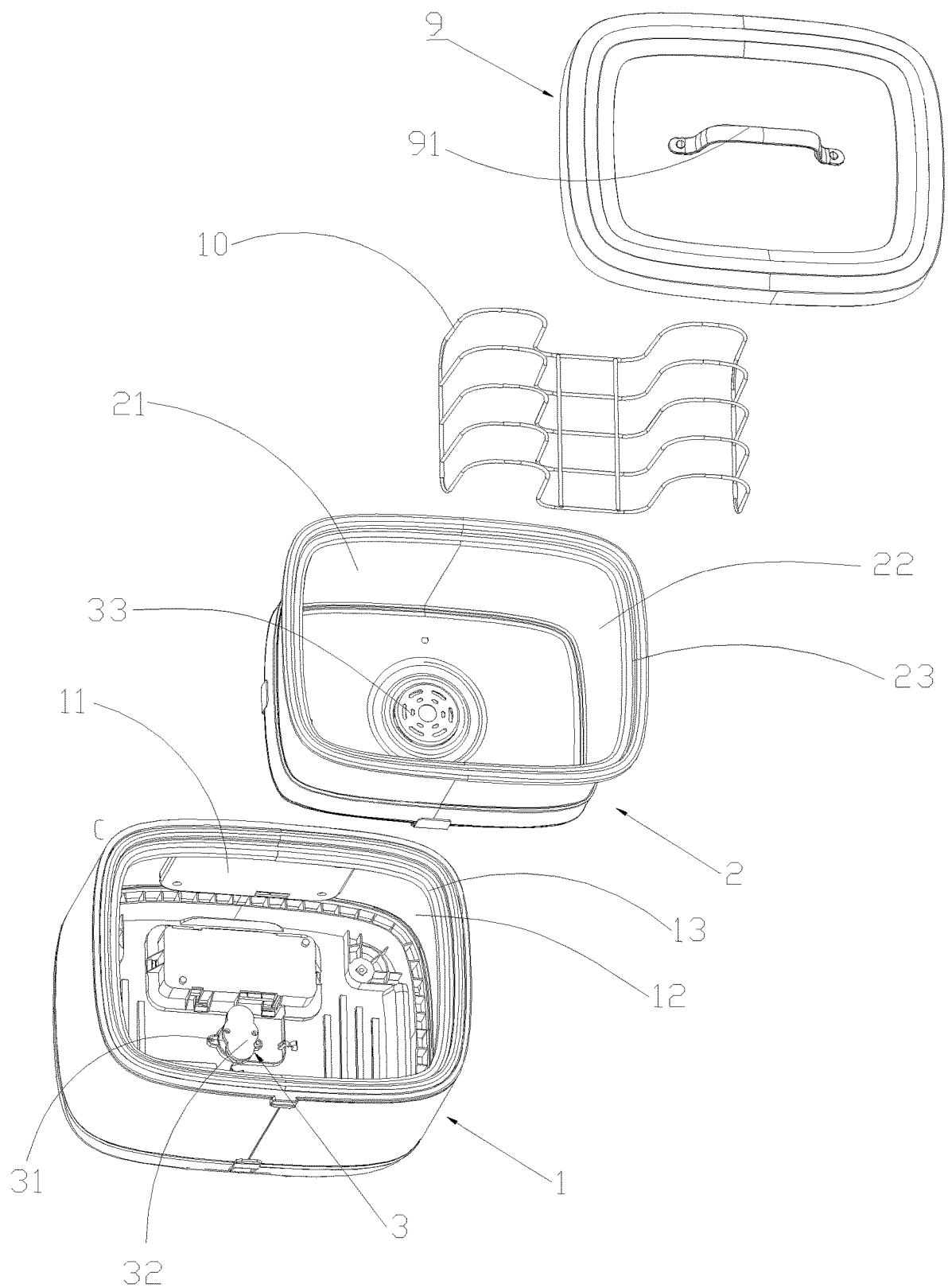
FIG. 2 is an exploded diagram of the present disclosure.
Figure 3:
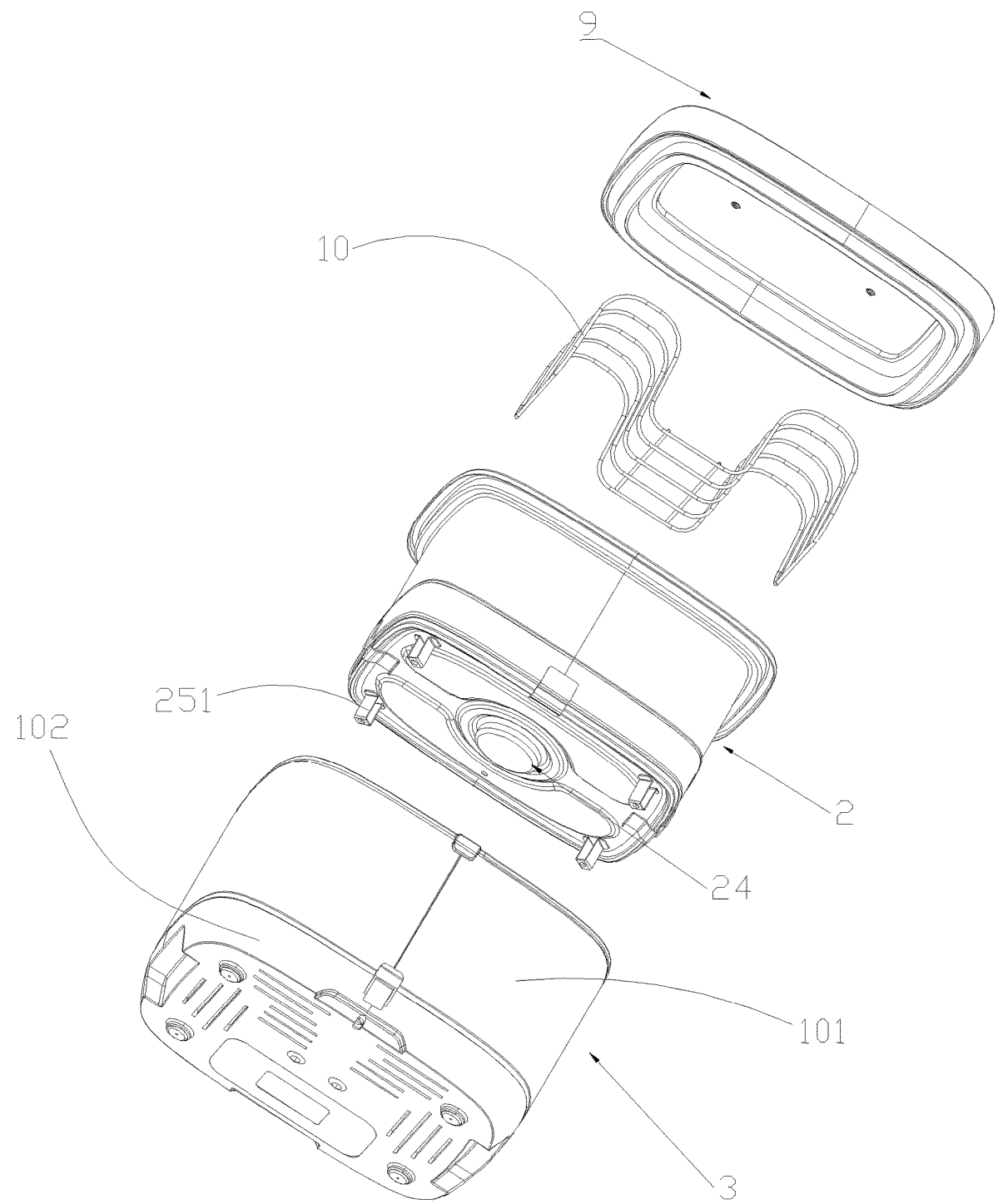
FIG. 3 is another exploded diagram of the present disclosure.
Figure 4:
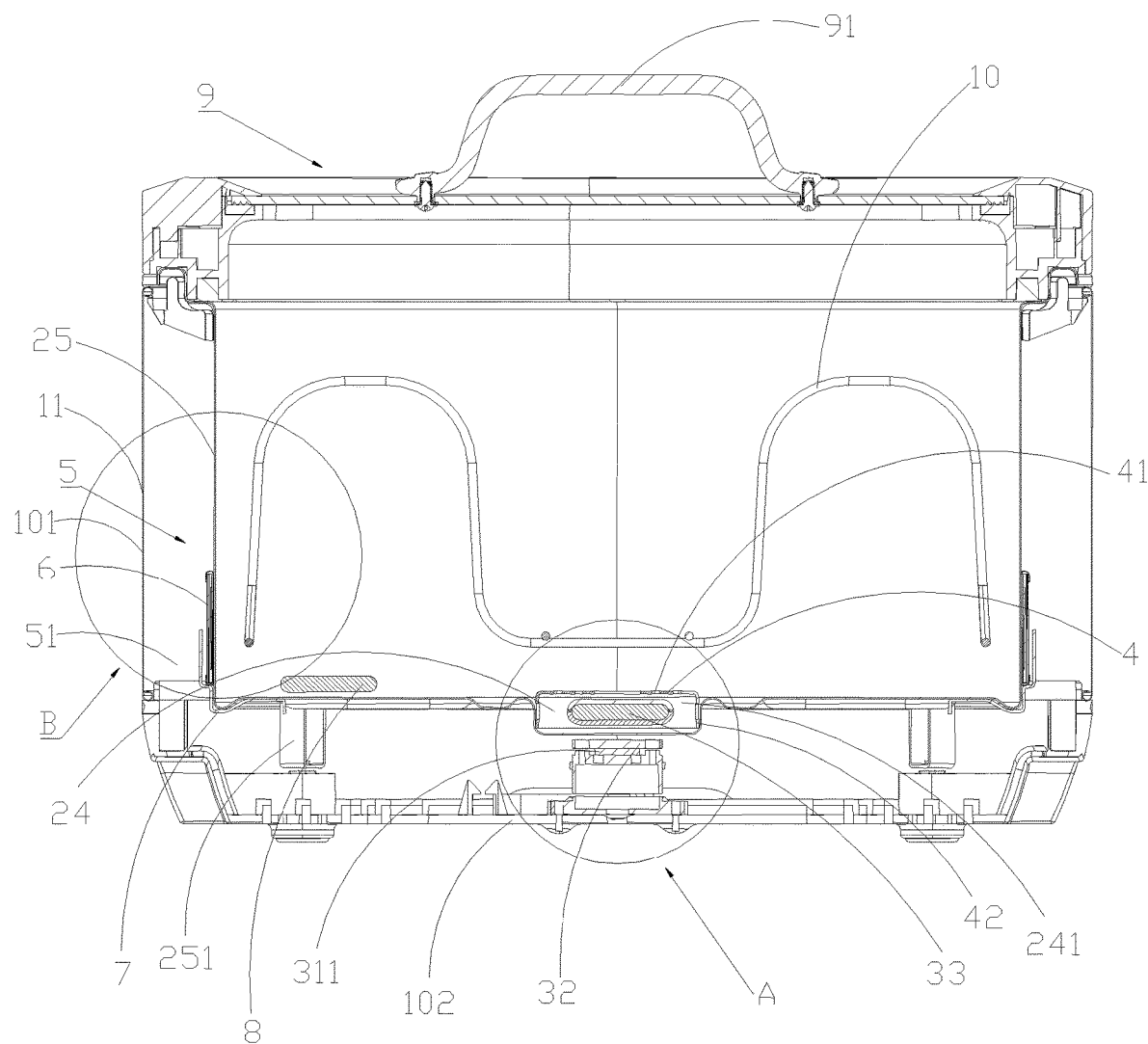
FIG. 4 is a sectional diagram of sectioning along a housing, an inner container, an actuating device, and a heating device.
Figure 5:
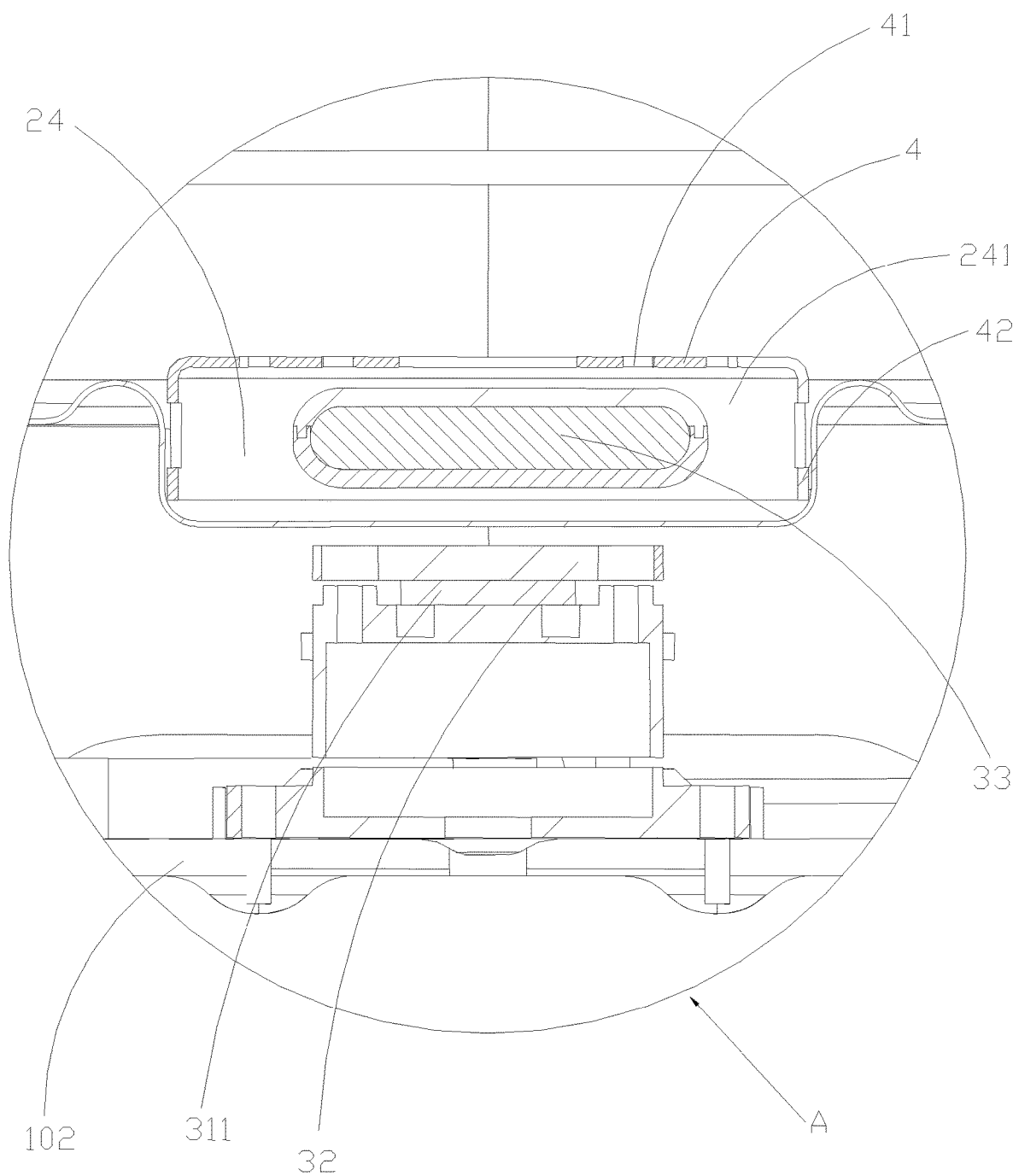
FIG. 5 is an enlarged diagram of the part A of FIG. 4.
Figure 6:
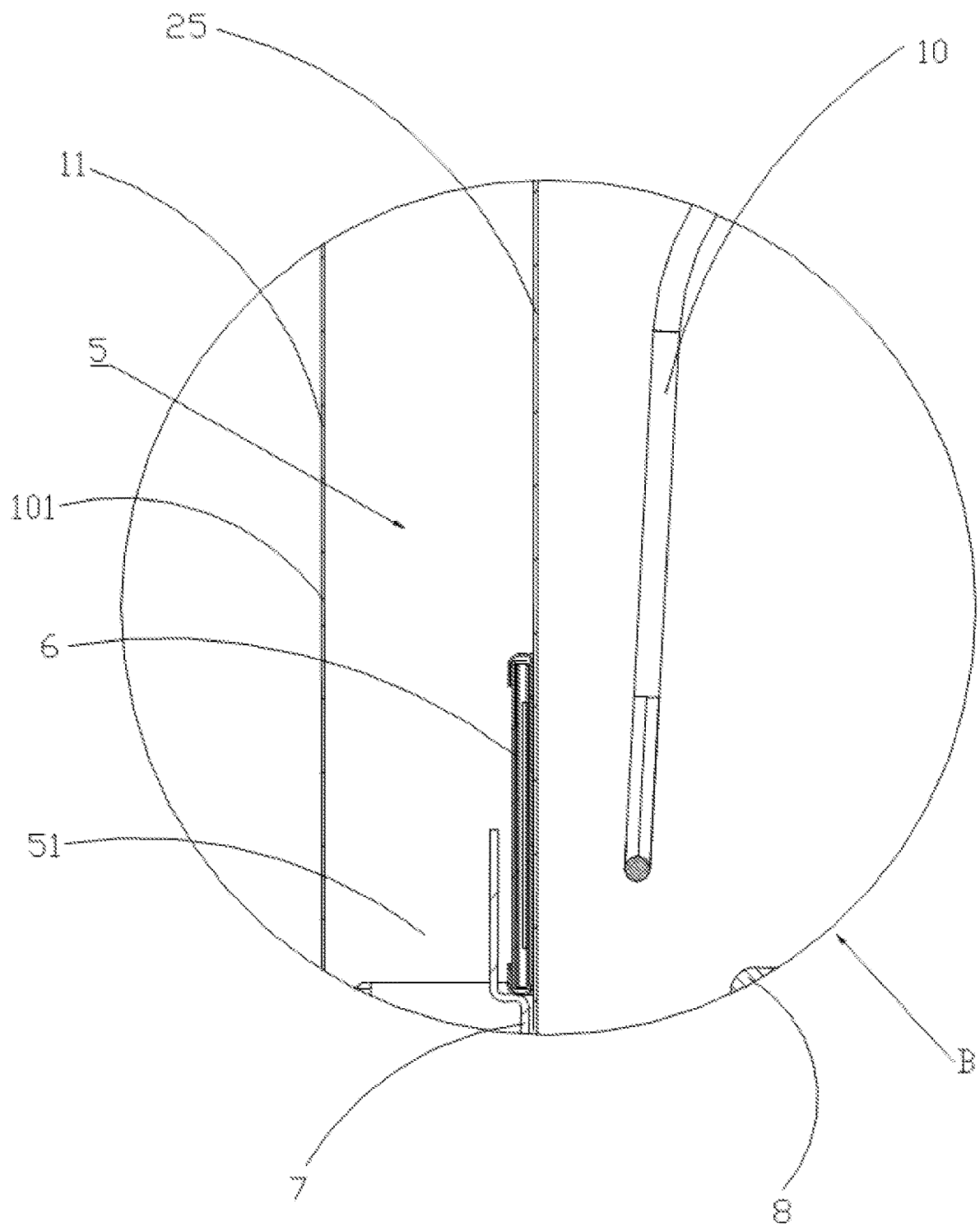
FIG. 6 is an enlarged diagram of the part B of FIG. 4.
Figure 7:
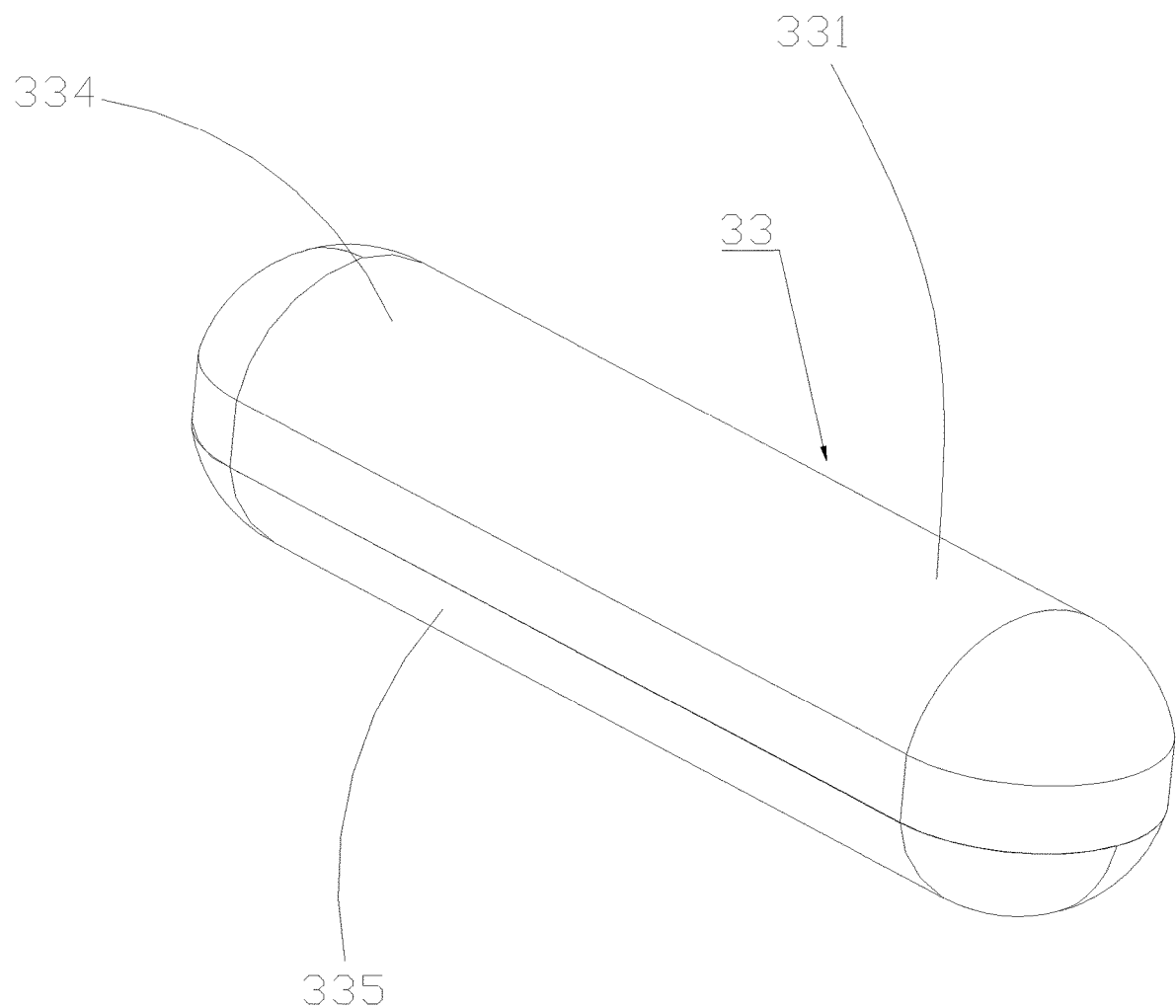
FIG. 7 is a schematic diagram of an entire structure of a second magnetic element.
Figure 8:
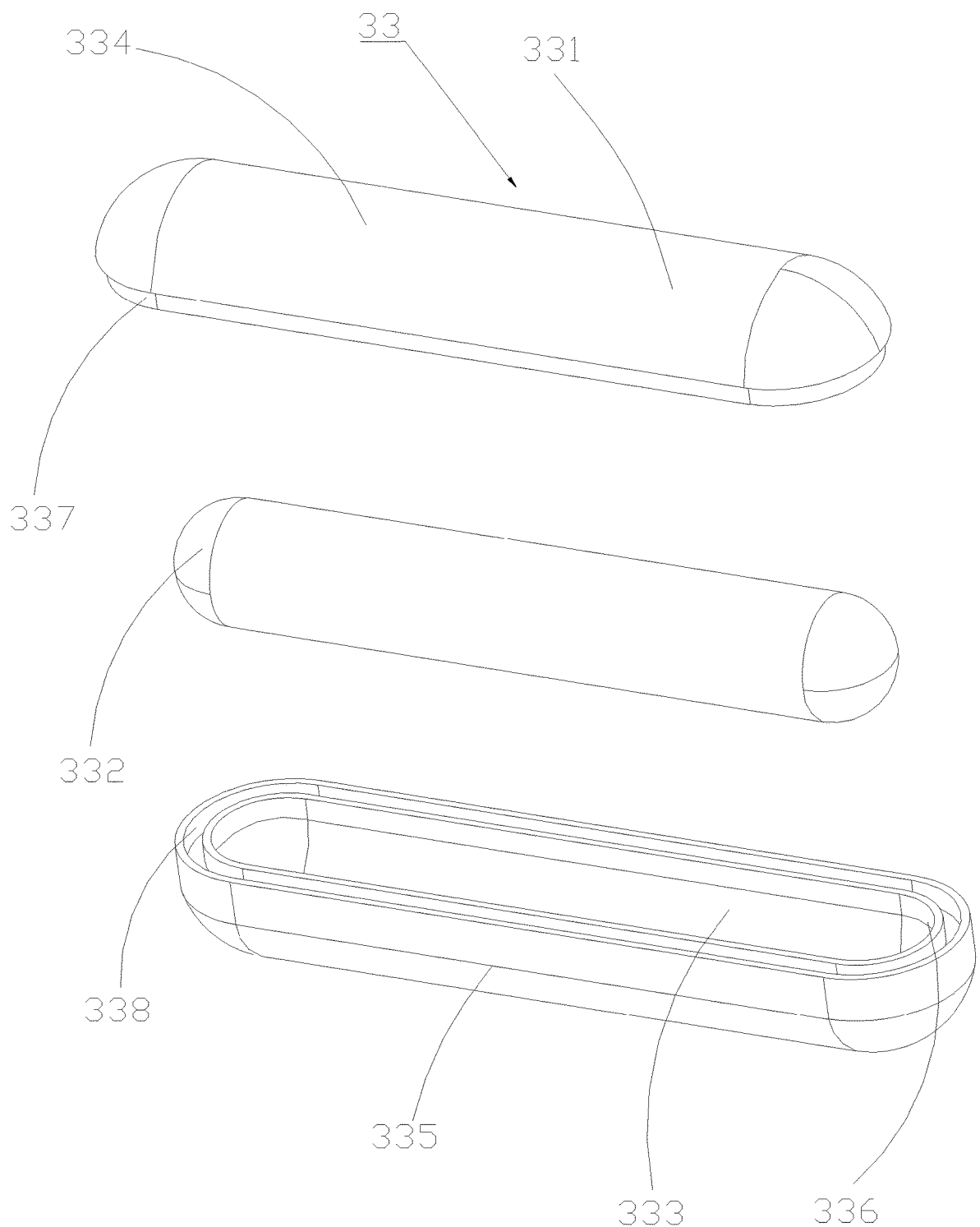
FIG. 8 is an exploded diagram of a second magnetic element.
Figure 9:
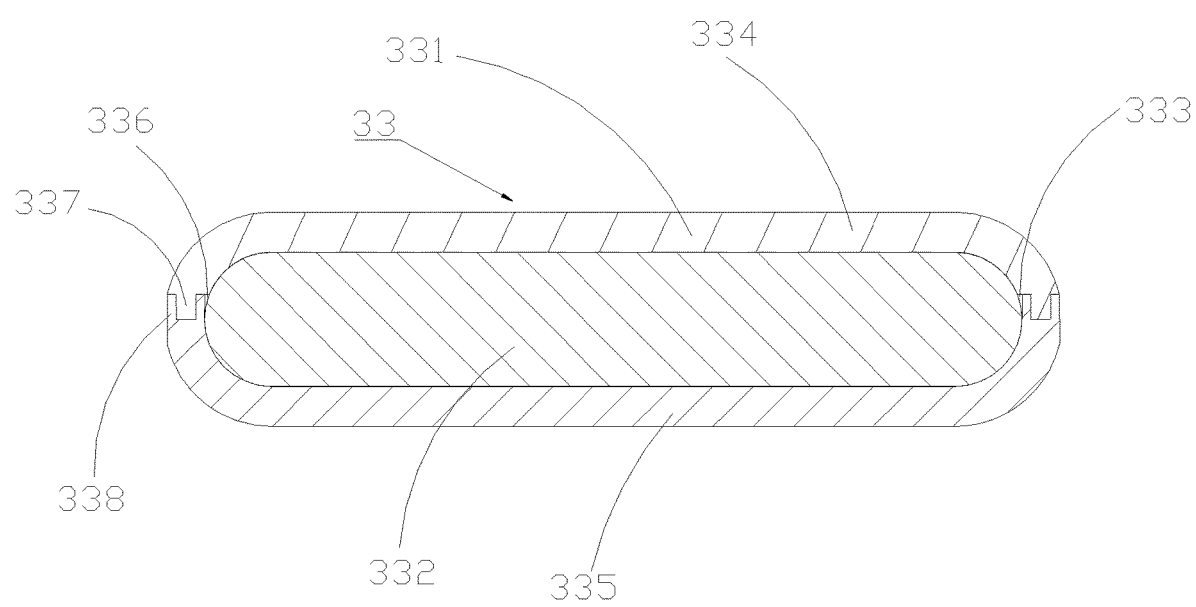
FIG. 9 is a sectional view of sectioning along a second magnetic element.

Referring to FIG. 1 to FIG. 5, a slow cooker includes:

a housing 1, wherein the housing 1 is provided with a first inner wall 11, a first accommodating cavity 12, and a first accommodating opening 13; the first accommodating cavity 12 is formed around the first inner wall 11; the first accommodating cavity 12 is communicated with the first accommodating opening 13;

an inner container 2, wherein the inner container 2 is arranged into the first accommodating cavity 12 via the first accommodating opening 13; and an actuating device 3, wherein the actuating device 3 is configured to push water in the inner container 2 to flow.

According to the above structure, the slow cooker includes: a housing 1, wherein the housing 1 is provided with a first inner wall 11, a first accommodating cavity 12, and a first accommodating opening 13; the first accommodating cavity 12 is formed around the first inner wall 11; the first accommodating cavity 12 is communicated with the first accommodating opening 13; an inner container 2, wherein the inner container 2 is arranged into the first accommodating cavity 12 via the first accommodating opening 13; and an actuating device 3, wherein the actuating device 3 is configured to push water in the inner container 2 to flow. Therefore, the water in the inner container 2 is heated by using a heating device 6, and the actuating device 3 pushes the water in the inner container 2 to flow, so that the water in the inner container 2 flows cyclically, which can quickly make the water in the inner container 2 to reach a uniform temperature, reduce a temperature difference of the water in the inner container 2 in the heating process, and improve the cooking effect.

In this embodiment, the actuating device 3 includes an actuating motor 31, a first magnetic element 32, and a second magnetic element 33; the inner container 2 is provided with a second inner wall 21, a second accommodating cavity 22, and a second accommodating opening 23; the second accommodating cavity 22 is formed around the second inner wall 21; the second accommodating cavity 22 is communicated with the second accommodating opening 23; the actuating motor 31 is provided with an actuating output shaft 311; the first magnetic element 32 sleeves the actuating output shaft 311; the second magnetic element 33 is arranged in the second accommodating cavity 22; when the first magnetic element 32 rotates with the actuating output shaft 311, the first magnetic element 32 actuates the second magnetic element 33 arranged in the second accommodating cavity 22 to rotate, so that the second magnetic element 33 pushes the water in the inner container 2 to flow. The inner container 2 is provided with an accommodating slot 24; the accommodating slot 24 is provided with a third accommodating opening 241; and the second magnetic element 33 is arranged in the accommodating slot 24 via the third accommodating opening 241. Specifically, the slow cooker further includes a fixed stand 4; when the second magnetic element 33 is arranged in the accommodating slot 24 via the third accommodating opening 241; the fixed stand 4 is covered at the third accommodating opening 241 to stop the second magnetic element 33 in the accommodating slot 24. Further, the fixed stand 4 is provided with several water flowing channels 41; and the accommodating slot 24, the water flowing channels 41, and the second accommodating cavity 22 are communicated with each other. Much further, the fixed stand 4 is provided with several stop legs 42, and the fixed stand 4 is supported in the accommodating slot 24 through the stop legs 42. According to the above structure, the first magnetic element 32 can rotate with the actuating output shaft 311 of the actuating motor 31. The first magnetic element 32 can rotate to drive the second magnetic element 33 arranged in the accommodating slot 24 to rotate. The second magnetic element 33 can rotate to drive the water in the second accommodating cavity 22 to flow to form rotational flow, so that the water in the inner container 2 flows cyclically, which can quickly make the water in the inner container 2 to reach a uniform temperature, reduce a temperature difference of the water in the inner container 2 in the heating process, and improve the cooking effect. Furthermore, due to the arrangement of the fixed stand 4, the second magnetic element 33 can be stopped in the accommodating slot 24, so that the second magnetic element 33 stably rotates in the accommodating slot 24, and the second magnetic element 33 more stably drives the water in the second accommodating cavity 22 to flow to form the rotational flow.

In this embodiment, the first magnetic element 32 is a magnetic ring, and the second magnetic element 33 is a magnetic rod. The second magnetic element 33 includes a mounting outer shell 331 and a magnet rod 332. The mounting outer shell 331 is provided with a third accommodating cavity 333, and the magnet rod 332 is arranged in the third accommodating cavity 333. The mounting outer shell 331 includes an upper shell 334 and a lower shell 335. The lower shell 335 is provided with a mounting opening 336. When the upper shell 334 is detachably covered at the mounting opening 336 of the lower shell 335, the third accommodating cavity 333 is formed. The mounting outer shell 331 is a polytetrafluoroethylene (PTFE) mounting outer shell. Specifically, the upper shell is provided with an annular convex block 337, and the lower shell is provided with an annular groove 338. When the upper shell is detachably covered at the mounting opening of the lower shell, the annular convex block is connected to the annular groove. According to the above structure, the arrangement of the first magnetic element and the arrangement of the second magnetic element are effectively completed. Furthermore, the magnet rod 332 is arranged in the third accommodating cavity of the PTFE mounting outer shell, which can prevent the magnet rod from being in direct contact with the water in the second accommodating cavity. The PTFE mounting outer shell has good heat resistance and cold resistance, and can be used for long time at −180° C. to 260° C. The PTFE mounting outer shell has the characteristics of resistance to acid, alkaline, and various organic solvents, and is nearly not dissolved in all solvents. Meanwhile, PTFE features with high-temperature resistance, which perfectly matches a use scenario of heating of the slow cooker and greatly improves the service life and safety of the slow cooker. The upper shell 334 is provided with an annular plugging block 337. The mounting opening is provided with an annular plugging slot 338. The annular plugging block 337 is detachably connected to the annular plugging slot 338, so that the upper shell is detachably hermetically covered at the mounting opening of the lower shell.

In this embodiment, the inner container 2 is provided with a first outer wall 25; when the inner container 2 is arranged into the first accommodating cavity 12 via the first accommodating opening 13, a gap 5 is formed between the first outer wall 25 of the inner container 2 and the first inner wall 11 of the housing 1; the actuating motor 31 and the first magnetic element 32 are arranged in the gap 5; and the actuating motor 31 and the first magnetic element 32 are arranged towards the second magnetic element 33. A supporting member 251 is arranged on the first outer wall 25 of the inner container 2; and the supporting member 251 supports the inner container 2 into the first accommodating cavity 12, so that the gap 5 is formed between the first outer wall 25 of the inner container 2 and the first inner wall 11 of the housing 1. Specifically, the gap 5 includes a first gap unit 51 and a second gap unit 52. The first outer wall 25 of the inner container 2 includes a first outer side wall 252 and a first outer bottom wall 253. The first inner wall 11 of the housing 1 includes a first inner side wall 111 and a first inner bottom wall 112. The first gap unit 51 is formed between the first outer side wall 252 and the first inner side wall 111. The second gap unit 52 is formed between the first outer bottom wall 253 and the first inner bottom wall 112. The actuating motor 31 and the first magnetic element 32 is arranged in the first gap unit 51 and/or the second gap unit 52. Further, the accommodating slot 24 is formed by sinking the second inner wall 21 of the inner container 2 towards the first inner wall 11 of the housing 1. The second inner wall 21 is provided with the second inner side wall 211 and the second inner bottom wall 212. When the actuating motor 31 and the first magnetic element 32 are arranged in the first gap unit 51, the second inner side wall 211 is sunken towards the first inner side wall 111 to form the accommodating slot 24. Or, when the actuating motor 31 and the first magnetic element 32 are arranged in the second gap unit 52, the second inner bottom wall 212 is sunken towards the first inner bottom wall to form the accommodating slot 24. Much further, a material of the inner container 2 is stainless steel. According to the above structure, the slow cooker has a reasonable design, a simple and compact structure, and stable connection, and effectively achieves the arrangement of the actuating motor 31, the first magnetic element 32, the second magnetic element 33, and the accommodating slot 24. The actuating motor 31 and the first magnetic element 32 are arranged in the gap 5 towards the second magnetic element 33. The first magnetic element 32 can rotate to drive the second magnetic element 33 in the accommodating slot 24 of the inner container 2 to rotate through the inner container 2, so as to push the water to flow to form the rotational flow, making the water in the inner container 2 to flow cyclically.

In this embodiment, a support 10 for cooking is also arranged in the second accommodating cavity. The support 10 for cooking is configured to support a container with food.

In this embodiment, the slow cooker further includes a heating device 6 and a mounting bracket 7; the mounting bracket 7 is connected to the housing 1; the heating device 6 is connected to the mounting bracket 7; and the heating device 6 is arranged around the first outer wall 25 of the inner container 2. The slow cooker further includes a temperature sensing probe 8; the temperature sensing probe 8 is arranged in the second accommodating cavity 22 and is configured to sense a temperature of water in the second accommodating cavity 22. According to the above structure, the temperature sensing probe 8 is arranged in the second accommodating cavity 22, which can monitor the temperature of the water in the second accommodating cavity 22 in real time, so as to control the temperature of the water in the second accommodating cavity 22 more accurately.

In this embodiment, the housing 1 includes an accommodating housing 101 and a base 102. The accommodating housing 101 is connected to the base 102.

In this embodiment, the housing 1 is also provided with a display screen 103 and several buttons 104. The display screen 103 is configured to display cook time, a cook temperature, and a cook mode, and the several buttons 104 are configured to switch the cook time, the cook temperature, and the cook mode.

In this embodiment, the slow cooker further includes a cover body 9. The cover body 9 is detachably covered at the first accommodating opening 13, and the cover body 9 is provided with a handle 91. According to the above structure, when food or a stew pot with food is put into the second accommodating cavity 22 for heating and slow cooking via the second accommodating opening 23, the cover body 9 can be covered at the first accommodating opening 13 and the second accommodating opening 23 to reduce loss of heat and improve the heating efficiency. Furthermore, due to the handle 91, it is convenient for a user to place and take away the cover, preventing the user from being scalded.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A slow cooker, comprising:
a housing, wherein the housing is provided with a first inner wall, a first accommodating cavity, and a first accommodating opening; the first accommodating cavity is formed around the first inner wall; the first accommodating cavity is communicated with the first accommodating opening;
an inner container, wherein the inner container is arranged into the first accommodating cavity via the first accommodating opening; and
an actuating device, wherein the actuating device is configured to push water in the inner container to flow;
wherein the actuating device comprises an actuating motor, a first magnetic element, and a second magnetic element; the inner container is provided with a second inner wall, a second accommodating cavity, and a second accommodating opening; the second accommodating cavity is formed around the second inner wall; the second accommodating cavity is communicated with the second accommodating opening: the actuating motor is provided with an actuating output shaft: the first magnetic element sleeves the actuating output shaft; the second magnetic element is arranged in the second accommodating cavity; when the first magnetic element rotates with the actuating output shaft, the first magnetic element actuates the second magnetic element arranged in the second accommodating cavity to rotate, so that the second magnetic element pushes the water in the inner container to flow;
wherein the first magnetic element is a magnetic ring, and the second magnetic element is a magnetic rod, the second magnetic element comprises a mounting outer shell and a magnet rod, the mounting outer shell is provided with a third accommodating cavity, and the magnet rod is arranged in the third accommodating cavity.

2. The slow cooker according to claim 1, wherein the inner container is provided with an accommodating slot; the accommodating slot is provided with a third accommodating opening; and the second magnetic element is arranged in the accommodating slot via the third accommodating opening.

3. The slow cooker according to claim 2, further comprising a fixed stand, wherein when the second magnetic element is arranged in the accommodating slot via the third accommodating opening; the fixed stand is covered at the third accommodating opening to stop the second magnetic element in the accommodating slot.

4. The slow cooker according to claim 3, wherein the fixed stand is provided with several water flowing channels; and the accommodating slot, the water flowing channels, and the second accommodating cavity are communicated with each other.

5. The slow cooker according to claim 2, wherein the inner container is provided with a first outer wall; when the inner container is arranged into the first accommodating cavity via the first accommodating opening, a gap is formed between the first outer wall of the inner container and the first inner wall of the housing; the actuating motor and the first magnetic element are arranged in the gap; and the actuating motor and the first magnetic element are arranged towards the second magnetic element.

6. The slow cooker according to claim 5, wherein a supporting member is arranged on the first outer wall of the inner container; and the supporting member supports the inner container into the first accommodating cavity, so that the gap is formed between the first outer wall of the inner container and the first inner wall of the housing.

7. The slow cooker according to claim 5, further comprising a heating device and a mounting bracket, wherein the mounting bracket is connected to the housing; the heating device is connected to the mounting bracket; and the heating device is arranged around the first outer wall of the inner container.

8. The slow cooker according to claim 7, further comprising a temperature sensing probe, wherein the temperature sensing probe is arranged in the second accommodating cavity and is configured to sense a temperature of water in the second accommodating cavity.

9. The slow cooker according to claim 1, further comprising a cover body, wherein the cover body is detachably covered at the first accommodating opening; and the cover body is provided with a handle.

10. The slow cooker according to claim 3, wherein the fixed stand is provided with several stop legs, and the fixed stand is supported in the accommodating slot through the stop legs.

11. The slow cooker according to claim 1, further comprising a support for cooking, wherein the support for cooking is also arranged in the second accommodating cavity, and the support for cooking is configured to support a container with food.

12. The slow cooker according to claim 11, wherein the support is in a wave shape in cross-section.

13. The slow cooker according to claim 1, wherein the mounting outer shell is made of polytetrafluoroethylene (PTFE).

* * * * *